Figure 1:
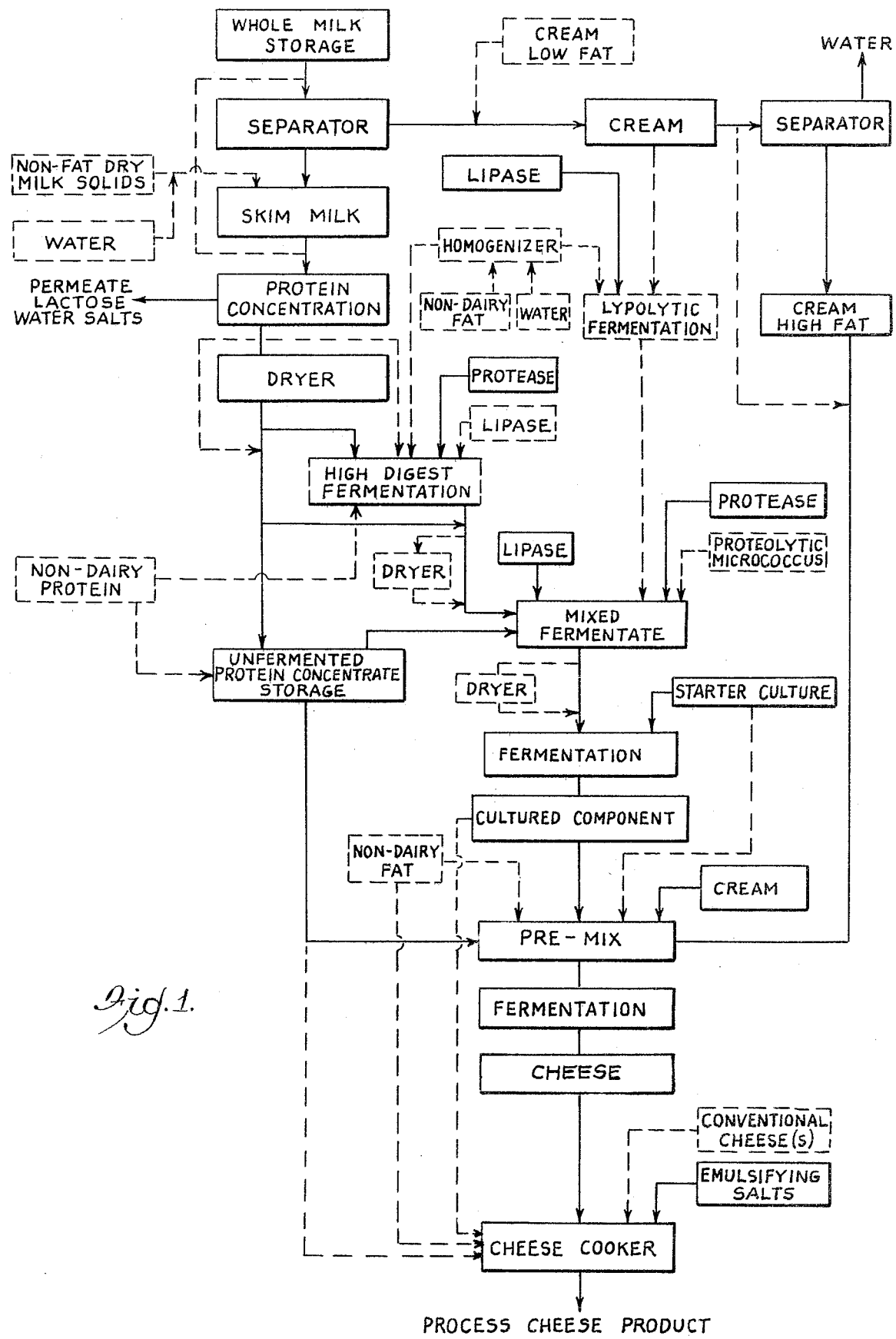

United States Patent [19]

Wargel et al.

[11] 4,244,971

[45] Jan. 13, 1981

[54] PROCESS AND PRODUCTS FOR THE MANUFACTURE OF CHEESE FLAVORED PRODUCTS

[75] Inventors: Robert J. Wargel, Winnetka; Steven P. Greiner, Waukegan, both of Ill.; David H. Hettinga, Orinda, Calif.

[73] Assignee: Kraft, Inc., Glenview, Ill.

[21] Appl. No.: 952,813

[22] Filed: Oct. 19, 1978

[51] Int. Cl.$^3$ .................... A23C 19/02; A23C 19/12
[52] U.S. Cl. ........................................ 426/35; 426/36; 426/40; 426/42
[58] Field of Search ............... 426/34, 35, 36, 40, 426/42

[56] References Cited

U.S. PATENT DOCUMENTS

| | | | |
|---|---|---|---|
| 3,156,568 | 11/1964 | Hargrove et al. | 426/36 |
| 4,131,688 | 12/1978 | Grosclaude et al. | 426/36 |

FOREIGN PATENT DOCUMENTS

| | | | |
|---|---|---|---|
| 2545847 | 4/1977 | Fed. Rep. of Germany | 426/36 |
| 262616 | 11/1968 | U.S.S.R. | 426/36 |

OTHER PUBLICATIONS

R. C. Jolly and Kasikowski, A New Blue Cheese Food Material from Ultrafiltered Skim Milk and Microbial Enzyme-Mole Spore Reacted, Fat. J. Dairy Sci., vol. 58, No. 9, 1975, pp. 1272–1275.
Kosikowski et al., Changes In Cheddar Cheese by Commercial Enzyme Preparations, Joun. Dairy Sci., vol. 36, No. 7, 1953, p. 574.

*Primary Examiner*—Jeanette M. Hunter
*Attorney, Agent, or Firm*—Fitch, Even, Tabin, Flannery & Welsh

[57] ABSTRACT

A process and product are provided for the rapid manufacture of cheese products, and particularly process cheese-type products as hereinafter defined. In the process, a cultured component is prepared and mixed with a milk protein concentrate and a fat concentrate, which mixture is fermented to provide a cheese material capable of being made into process cheese-type products by conventional cheese cooking techniques. The cultured component is prepared by proteolyzing milk protein and by lipolyzing milk fat, and forming a mixed fermentate of these hydrolyzed materials. The mixed fermentate is combined with a cheese starter culture and fermented to give the cultured component.

17 Claims, 1 Drawing Figure

PROCESS AND PRODUCTS FOR THE MANUFACTURE OF CHEESE FLAVORED PRODUCTS

The present invention relates generally to cheese products and their method of manufacture. More particularly, the present invention is directed to the provision of a material suitable for the preparation of process cheese-type products by a manufacturing method which substantially reduces the amount of time required to convert raw materials to such process cheese-type products and which provides a consistent product.

As used herein, the term "process cheese-type products" shall include those products known and referred to as "pasteurized process cheese", "pasteurized process cheese food", "pasteurized process cheese spread", and "pasteurized process cheese product". The term "process cheese-type products" shall also be deemed to include products resembling process cheese, process cheese food, process cheese spread and process cheese product, but which may not meet the U.S. Federal Standards of Identity for any of the above products in that they contain ingredients not specified by such Standards, such as vegetable oil or vegetable protein, or do not meet the compositional requirements of such Standards. The term, process cheese-type products, shall be deemed to include any product, including but not limited to those referred to above, having a flavor and texture of a process cheese-type product regardless of the ingredients or manufacturing steps employed, and regardless of whether the Standards which exist are met.

Natural cheese is generally made by taking animal milk, developing acidity and setting the milk with a clotting agent, such as rennet, or by developing acidity to the isoelectric point of the protein. The set milk is cut and whey is separated from the resulting curd. The curd may be pressed to provide a cheese block and curing takes place over a period of time under controlled conditions. A product having flavor and body characteristics of natural cheese has been made by replacing at least a portion of the animal fat of the milk with a vegetable fat, such as corn oil, and/or by replacing at least a portion of the casein of the milk with an analog protein.

It is well known to provide a product having some of the characteristics of natural cheese by grinding a natural cheese, and heating it with an emulsifying salt. The name given to the resulting product depends upon the ingredients used and its composition and, in some instances, is determined by regulations promulgated by the U.S. Food and Drug Administration. For example, the term "pasteurized process cheese" refers to a product comprising a blend of cheeses to which an emulsifying agent, usually an emulsifying salt, and possibly acids, are added, the mixture is then worked and heated into a homogeneous, plastic mass. The moisture level of process cheese generally does not exceed about forty-four (44) percent and process cheese has a minimum fat level of about forty (40) percent, on a dry basis, under the U.S. Federal Standards.

The term "pasteurized process cheese food" refers to a product which is prepared from the same materials and the same processes used for manufacture of process cheese. However, cheese food generally has dairy ingredients added thereto, such as cream, milk, skimmed milk, whey, or any of these from which part of the water has been removed (e.g., concentrated skimmed milk). The moisture level in process cheese food is generally higher than that of process cheese and may be up to about forty-four (44) percent. Fat is present at a level of between about twenty-three (23) percent and twenty-six (26) percent, as is.

The term "pasteurized process cheese spread" refers to a product which is similar to cheese food, in the sense that it can contain the indicated dairy ingredients. Process cheese spread, however, may have a moisture level as high as sixty (60) percent. The minimum fat level for cheese spread under U.S. Federal Standards is twenty (20) percent, as is.

Process cheese, process cheese food, and process cheese spread are referred to as "standardized products", since their method of manufacture and composition are determined by Federal Standards of Identity.

There is also pending before the U.S. Federal Drug Administration a proposed standard for a "pasteurized process cheese product" which has a higher moisture level and lower fat level than a process cheese spread.

In addition, it is possible to manufacture products resembling process cheese, process cheese food, process cheese spread, and process cheese product by substituting a vegetable fat or a vegetable protein derived cheese analog for at least a portion of the cheese ingredient.

As indicated, presently known process cheese-type products may use a natural cheese or a cheese analog as a principal ingredient. The manufacture of natural cheese or cheese analog for these products can require extended curing times to develop the desired flavor. Generally, the amount of flavor developed is proportional to the length of time of curing and the extent of breakdown of the cheese. For instance, Cheddar cheese which is cured for a relatively short period of time, e.g., ten (10) days, and which is referred to as "current cheese", has little cheese flavor or breakdown of the body; Cheddar cheese which is cured from about three (3) to six (6) months, is referred to as "short held cheese" and has increased flavor with increased body breakdown; and Cheddar cheese which is cured for periods in excess of about six (6) months and up to a year or more, is referred to as "long hold cheese" or "fully aged cheese," and has a high cheese flavor with more body breakdown. The manufacture of process cheese-type products may use a blend of these cheeses to provide the desired flavor, body and texture in the final product. However, this method of manufacture of process cheese-type products makes it necessary to store cheese for substantial periods of time. Such storage is expensive and it would be desirable to provide a method for the manufacture of process cheese-type products in a much shorter period of time so as to avoid the need for any extended storage of cheese. Further, present methods of manufacturing process cheese-type products may require selection and proportioning of the cheese ingredients which requires special techniques and can result in flavor variations. It would be desirable to provide more consistent raw materials.

Accordingly, it is a principal object of the present invention to provide an improved method for the manufacture of a process cheese-type product.

A related object of the invention is to provide a method of manufacture of the cheese ingredient for use in process cheese-type products which greatly reduces the amount of time required to produce process cheese-type products.

It is still another object of the invention to provide process cheese-type products in higher yield from milk.

A further object of the present invention is to consistently provide a cheese of like flavor, body and texture.

A specific object of the invention is to provide an economical and consistent product for the manufacture of process cheese-type products whereby the cheese portion is partly or wholly provided by a cheese produced in a relatively short period of time.

It is also an object of the invention to provide a cultured component which can be readily used in the manufacture of process cheese-type products or other food products.

Further objects and advantages of the invention will become more apparent by reference to the following detailed description and drawings.

FIG. 1 which is a flow chart illustrating various features of the method of the present invention. The dotted lines in the drawing represent options in the manufacture of process cheese-type products or the cultured component.

In a primary aspect, the present invention involves the manufacture of a cultured component which can be mixed or combined with a protein, primarily derived from milk, and a concentrated fat, including milk fat, and fermented to provide a cheese primarily for use in process cheese-type products and like products. In the method of the invention a milk protein concentrate and a milk fat concentrate are prepared. The extent of concentration is adjusted for use, in accordance with the invention, to provide a process cheese-type product having desired protein, fat and moisture concentrations. The unfermented milk protein concentrate should have less than fifty (50) percent moisture, and is preferably dry; a major portion of the unbound salts removed; and a lactose content of less than that which is soluble in the moisture phase of the cheese of the invention. For hard cheeses, the unfermented protein concentrate will normally have less than twenty (20) percent moisture. The unfermented fat concentrate comprises at least twenty (20) percent with the remainder being a serum, as in cream, but the unfermented fat concentrate will normally comprise more than fifty (50) percent fat and for hard type cheeses will comprise more than sixty-five (65) percent fat. A portion of the protein is preferably substantially digested with a proteolytic enzyme (protease) for several hours to hydrolyze the protein to provide a high digest proteolytic fermentate having cheese flavor components and precursors therefor. The protease should then be inactivated. A minor portion of the protein and fat in the cheese material in the form of protein concentrate and milk fat concentrate, and preferably high digest proteolytic fermentate, are combined with a low digest proteolytic enzyme, a lipolytic enzyme, and preferably a proteolytic microorganism to prepare a mixed fermentate. A portion of the fat concentrate may be first treated with a lipolytic enzyme (lipase) for about a day to hydrolyze the milk fat to provide a lipolytic fermentate having cheese flavor components and precursors therefor, in which event, the lipolytic fermentate can be added to the mixed fermentate. The mixed fermentate is then fermented for a few hours to cause low digestion of milk protein, and lipolysis of fat if this has not been previously accomplished. The mixed fermentate is then preferably inoculated with a cheese starter culture and further fermented to develop acid for a couple of hours to provide a cultured component which can be useful in various food products as a flavor source material. The inoculation with cheese starter culture can occur after preparation of a pre-mix so that acid development occurs during fermentation of the pre-mix. However, this is a less preferred treatment.

The cultured component is a unique product which, when combined with protein concentrate and fat concentrate, permits the rapid development of cheese flavor and the provision of a cheese ready for manufacture into process cheese-type products. While it is not altogether understood, it is believed that the high digest and low digest milk proteins in the cultured component permit or cause the rapid development of cheese flavor. It is to be particularly noted that only a minor portion of the protein is digested and the amount of protein digested is between five (5) and fifty (50) percent of the protein in the resulting cheese. Optimum results are achieved by digesting between about seven (7) and twenty (20) percent of the protein with preferred results being achieved by digesting about ten (10) percent of the protein in the cheese material. High digestion of the protein provides amino acids and peptides having molecular weights of less than 5000 and are beneficial in expediting the development of cheese flavor in the cheese. Because of the activity of high digestion proteases, which are generally tryptic proteases, they should be inactivated before low digestion treatment.

The fat concentrate should comprise milk fat at a level at least five (5) percent of the fat in the cheese material of the invention so that sufficient short chain fatty acids can be provided by lipolysis to give cheese flavor. Short chain fatty acids are considered to be those having carbon chain lengths of 2 to 10. Lipolysis is generally carried out to provide a fatty acid profile in the cheese material equivalent or similar to that in natural cheeses of comparable flavor. For some cheeses, such as Swiss cheese, there will be a minimum amount of lipolysis. While fat systems equivalent to milk fat may be substituted and can provide the desired fatty acid profile, such fat systems are less preferred.

The cheese starter culture develops acid by acting upon lactose which should be present at a level of at least about two (2) percent. The acid should develop in the cheese flavor component to a pH of between about 5.6 and 4.7. As before indicated, the lactose should be controlled so that the total lactose in the cheese material does not exceed its solubility in the moisture phase of the cheese material of the invention.

Various microorganisms normally used in the manufacture of natural cheese can be added to the cultured component to develop the characteristic flavor of various cheeses such as Swiss cheese, Romano cheese, Parmesan cheese, etc.

The cultured component, in a minor portion, is blended with protein concentrate, fat concentrate and water, if necessary, to form a pre-mix having the composition of the desired end product, such as an ingredient for a process cheese-type product. This pre-mix is then fermented to develop desired cheese flavor, body and texture. The resulting cheese is ready for manufacture into process cheese-type products as the sole cheese ingredient or in combination with other cheeses. If desired the body and texture of the cheese may be varied prior to the manufacture of process cheese-type products by causing acid increase, heating, and/or working.

The concentrates and fermentates can be independently prepared, and the pre-mix can be blended, fermented and made into process cheese-type products in less than twenty-four (24) hours. The fermentations can be controlled to provide consistency of product. Thus, a rapid process has been provided for making process cheese-type products of consistent flavor, body and texture.

As indicated, the cheese produced by the method of the invention is suitable for immediate use to prepare process cheese-type products and can be used as the sole source of cheese in the manufacture of process cheese-type products. It is an important feature of the present invention that the total time for effecting the various steps to produce the process cheese-type product of the invention from incoming milk is less than about 48 hours. It should be emphasized, however, that the steps of the method do not necessarily have to be conducted in continuing sequence and various intermediate products can be held for extended periods of time without affecting the quality of the final process cheese-type products.

The method of the present invention further differs from known cheese processes in that only minor portions of the milk protein and milk fat, which make up the cheese, need be hydrolyzed to rapidly provide cheese flavor and body. It is particularly noted that heretofore cheese manufacture has required the presence of all of the protein and fat in combination to achieve the desired body, texture and flavor associated with the cheese.

The method of the present invention also differs from known processes for making cheese in that rennet is not necessary or required. While rennet may be used in preparing the cheese, it is not required and thus the casein need not be converted into paracasein.

Various methods for the manufacture of cheese have been described wherein the time of manufacture of high flavored cheese is reduced by the use of enzymes added to the milk prior to the setting of the milk or added to the curd or cheese. It is to be particularly understood, however, that such methods have only been recognized wherein the enzymes are added to the totality of protein and fat used in the make procedure. Such methods have resulted in a reduction in time required to develop flavorful cheese but still require substantial time for desired flavor to develop. The use of higher curing temperatures in combination with the use of various microorganisms and enzymes has also been suggested for more rapid development of flavor, body and texture. However, none of the alternate methods have disclosed the successful manufacture of cheese having a desirable level of flavor, body and texture for use in the manufacture of process cheese within the short time period contemplated by the method of the present invention. Further, these previously known accelerated methods include normal cheese make procedures resulting in inconsistency of product and inflexibility in manufacturing steps, and loss in yield.

Referring now to FIG. 1, the method of the present invention will be described in further detail.

In FIG. 1, required and preferred steps in the method of the present invention are set forth in full lines. Various alternate or optional steps are depicted in the flow chart by dotted lines. The method of the invention contemplates the use of raw or heat-treated whole milk which is normally employed in the manufacture of cheese. The milk is preferably treated to separate cream from skim milk, or low fat milk, by use of conventional methods, such as a cream separator. As can be seen from FIG. 1, non-dairy protein and non-dairy fat can optionally be used in the method of the invention. However, at least 50 percent of the protein, but preferably at least 80 percent of the protein, and at least 5 percent of the fat of the cheese material of the invention is provided by protein and fat from cow's milk.

The skim or low fat milk is then treated to separate a major portion of the protein with bound salts and fat which may be present from a major portion of the lactose and unbound salt (ash). Water is removed to provide a protein concentrate having less than fifty (50) percent moisture. Such separation of salts and lactose can be accomplished by various methods and procedures, as by ultrafiltration, and acidification and centrifugation with whey separation. Ultrafiltration produces highest yields and maximizes utilization of milk proteins.

Further water removal can be effected by drying. The unfermented cream preferably comprises at least about sixty-five (65) percent fat to provide the unfermented fat concentrate for hard cheese types and at least twenty (20) percent to provide the fat concentrate for soft cheese types.

Thereafter, a portion of the protein concentrate and a portion of the cream are treated in combination or separately by suitable enzymes and/or organisms so as to hydrolyze the milk protein and the butterfat in the cream to provide the mixed fermentate. These enzymes should be enzymes which can be used in conventional cheese manufacture. Desirably, a portion of the protein is highly digested and another portion of the protein given low digest treatment.

The proteolytic enzyme used for the treatment of the protein to provide proteolytic fermentates is sometimes referred to herein as "protease", wherein the lipolytic enzyme used for the treatment of the fat to provide a lipolytic fermentate is sometimes referred to herein as "lipase".

A highly digested proteolytic fermentate, after protease deactivation, and cream or lipolytic fermentate are combined with added protein to provide a mixture to which is added a low digest protease and preferably a proteolytic microorganism. The added protease provides less digestion of the milk protein. Lipase is preferably added to the mixture to lipolyze cream although quite satisfactory results are achieved when a lipolytic fermentate is added to the mixture. The mixture is fermented to provide a mixed fermentate. The mixed fermentate comprises between about 5 percent and 35 percent of the total digestible protein as amino acids and peptides having a molecular weight below about 5000, based upon TCA (trichloroacetic acid) soluble protein, and between about 60 percent and about 70 percent of peptides having a molecular weight between about 5,000 and about 25,000, also based upon TCA soluble protein.

The milk fat is lipolyzed for American-type cheese products to provide fatty acids in the mixed fermentate with added starter culture at about the following percentages, for the indicated carbon chain lengths.

| | | | |
|---|---|---|---|
| $C_2$ | .025% | to | .18% |
| $C_4$ | .015% | to | .16% |
| $C_6$ | .005% | to | .025% |
| $C_8$ | .002% | to | .008% |
| $C_{10}$ | .005% | to | .020% |

As before indicated, for Swiss type cheese products, there is a minimum of lipolysis and low $C_4$ fatty acids are desired with higher formation of propionic acid.

The mixed fermentate is then mixed with a cheese starter culture of the kind conventionally used in cheese making and allowed to ferment and normally develops an acid in the range of between about pH 5.6 and pH 4.7. This provides the cultured component.

There should not be any substantial hydrolysis to the longer chain fatty acids in the fat so as to avoid "soapy" character.

The cultured component is then added, in minor proportion, to protein concentrate and to fat concentrate to provide a pre-mix which, upon fermentation, becomes the cheese material of the invention. The pre-mix for American-type cheese products comprises the following:

| Moisture | 31% | to | 36% |
|---|---|---|---|
| Protein | 24% | to | 27% |
| Fat | 32% | to | 36.5% |
| Ash | 1% | to | 5% |
| Lactose | 1% | to | 5% |
| pH | 5.0 | to | 6.5 |
| Ca/PO$_4$ | .5 | to | .6 |
| K/PO$_4$ | .06 | to | .12 |

The pre-mix is allowed to ferment generally for about 15 to 20 hours at about 72° F. (22° C.) to provide the desired body, texture and flavor. The pH of the cheese material should be in the range from about 5.3 to about 4.9. The resulting cheese is ready for cooking into process cheese-type products.

The provision of a cultured component having both proteolytic and lipolytic cheese flavor components and precursors which, when combined with additional protein, fat and water, if necessary, and subsequently fermented to provide a cheese ready for cooking into process cheese-type products is also believed new to the cheese-making art. This is to be compared with the conventional concepts in the cheese-making art that all of the protein and fat of the milk, in combination, needed to be uniformly treated in the manufacture of cheese and that conventional cheese-making procedures were required to provide raw material for process cheese-type products.

Now considering the invention in more particularity with the use of cow's milk, cow's milk, on average, has about 87 percent water, 3.5 percent fat, 3.5 percent protein, 5 percent lactose, 0.2 percent citric acid and 0.7 percent ash. Using conventional separation methods, each one thousand (1000) pounds of whole milk is separated into seventy (70) pounds of cream, containing about 50 percent butterfat, and 930 pounds of skim milk containing about 3.8 percent protein, 5.5 percent lactose and 0.75 percent ash.

In accordance with the present invention the cream portion of the skim milk portion are preferably treated separately prior to being recombined to provide the cheese materials.

In connection with the treatment of the skim milk, it should be noted that skim milk can be reconstituted from non-fat dry milk solids prepared as by spray drying and that a skim milk with low fat can be substituted. Low heat conditions are preferably used in spray drying. The skim milk is first treated to remove a major portion of the lactose, unbound salts and water.

Treatment of the skim milk to separate a major portion of the lactose, ash and water from the skim milk and provide a protein concentrate may be effected by various methods. A preferred method is by ultrafiltration. Ultrafiltration provides high protein yield and can be accomplished without any substantial changes in the native protein. Also, it does not require the use of heat. However, it should be understood that the protein concentrate may also be provided by precipitation of casein, as by acidification, and centrifugation. In the precipitation methods, a curd is provided which is separated from whey. The whey contains serum protein which is lost, unless the whey is specially treated; and it would be desirable to recover the serum protein during the concentration process, such as is accomplished by ultrafiltration. The protein concentrate can also be prepared from sodium caseinate provided that a suitable salt balance is achieved in reconstituting the protein concentrate.

It is desirable to reduce the level of lactose in the filtrate from ultrafiltration by washing, as with water. This washing is effected in a step known as diafiltering. The skim milk is preferably concentrated by ultrafiltration in the range of 4:1 to 5:1 and the lactose and unbound salts are proportionately removed. Washing further removes lactose and salts. The concentrated skim milk is preferably spray dried under low heat conditions to give a powder.

A portion of the concentrate or powder is then slurried and treated with an active protease to break down the milk protein into small fragments known as peptides and amino acids having molecular weights of less than 5000. The proteolytic treatment is terminated when between 5 percent and 35 percent of the TCA soluble protein is below 5000 in molecular weight. This is referred to as "high digestion". Between about 5 percent and 10 percent of the total protein of the cheese material is subjected to treatment during this step. Preferably, about 7.5 percent of the protein of the cheese material is subject to high digestion proteolytic treatment.

High digest proteolytic enzymes which may be used include crude pancreatin, papain, Amano 2A, and trypsin. Papain is less satisfactory than the others because of the development of bitterness. It is important that these enzymes be deactivated after the desired level of protein breakdown is achieved.

Milk fat is treated with a lipolytic enzyme of a type normally used in cheese manufacture to develop the above indicated fatty acid profile for American-type cheese flavor. The enzymes which give the preferred results are obtained from the throat tissue of animals and the commonly available Dairyland Capalase and Italase enzyme powders, and Marschall 300, 400, and 600 lipases are derived from calves, kids and lambs. Equivalent results can be obtained from fungal lipases available for cheese making. As little as five (5) percent of the fat, in the form of milk fat, in the cheese material needs to be treated. The lipase may be added directly into the mixed fermentate or to 50% cream which is incubated for up to about 24 hours at 98° F. (37° C.).

The mixed fermentate is prepared by mixing the high digest protease fermentate, cream or lipolytic fermentate, and protein, and preferably adding in addition a proteolytic micrococcus, a protease derived from *Bacillus subtilus* and a protease derived from fungi in the *Aspergillus-oryzae* group. Lipase is preferably added in order to effect lipolysis of the cream in the mixture. The preferred proteolytic micrococcus is disclosed in U.S. Pat. No. 3,650,786; the preferred protease from *Bacillus*

*subtilus* is sold by GB Fermentation Industries, Inc. of Des Plaines, Illinois, under the trademark Prolase RH; and the preferred fungal enzyme is sold by Rohm and Haas Company of Philadelphia, Pa., under the trademark Rhozyme P11. These proteases provide the indicated low digestion of protein breakdown products in the molecular weight range of 5,000 to 25,000.

The mixed fermentate is desirably fermented for about 3 hours at 98° F. (37° C.) to achieve desired proteolysis and lipolysis. The mixed fermentate is then mixed with a cheese starter culture common in the cheese industry. Acid development occurs. The presence of the high digest protease fermentate facilitates the development of flavor. This fermentation is carried out over a period of about two (2) hours at about 98° F. (37° C.) to provide the cultured component.

In an alternate embodiment of the present invention, whole milk is subjected to the protein concentration step and a protein/fat substrate is present during the fermentation of the mixed fermentate. For this embodiment, the lipases and proteases are also combined for fermentation of the mixed fermentate. As can be seen in FIG. 1, fat other than milk fat, non-dairy fat, can be added to the protein concentrate or cream prior to incorporation into the mixed fermentate or pre-mix.

During protein fermentation, the hydrolysis products provide trichloroacetic acid (TCA) soluble tyrosine in an amount of from between about 1000 and about 3,000 micrograms per milliliter. As before indicated, fermentation basically converts a substantial portion of the large casein molecules to small molecular weight proteins, peptides and amino acids which provide the cheese flavor components and precursors therefor. If excessive protein hydrolysis occurs, bitterness and off flavors develop in the final process cheese-type product and body and texture are unsatisfactory. Insufficient protein hydrolysis limits rapid flavor development and provision of a cheese product having the desired cheese flavor, body and texture characteristics.

In a preferred embodiment, only ten (10) to twenty (20) percent of the cream obtained from the whole milk is subjected to lipase treatment. As shown in the flow chart, at least a portion of the fat fermented during the lipase treatment of the cream may be a non-dairy fat of animal or vegetable origin.

To provide better control of the final fat analysis, of the cheese material, the portion of cream which is not subjected to lipase treatment may be passed through a second separator, as shown in FIG. 1, to provide a cream with higher fat content. The cream which is initially separated from the whole milk has a level of fat in the range of from about 30 to about 60 percent by weight of milk fat. The cream which is subjected to separation in the second separator has a high level of fat in the range of from about 50 to about 80 percent milk fat. Such provision of a high fat cream permits adjustment of fat content in the cheese material with relative ease. As shown in FIG. 1, however, the low fat cream portion not used in the lipase treatment can bypass the separator if a source of high fat cream is not required, as with soft cheeses or high moisture process cheese-type products.

Lipase is then added to the portion of cream which is to be subjected to lipolytic treatment. This cream portion is fermented with cheese-making lipases to provide desired fat breakdown and desired flavor components or precursors therefor, as before indicated. As indicated in FIG. 1, a portion of the fat subjected to lipase treatment can be non-dairy fat derived from animal or vegetable sources. However, at least about 5 percent of the fat in the cheese material should be milk fat which is subjected to lipase treatment. When lower amounts of milk fat are utilized, higher lipolysis generally should be achieved to obtain the desired fatty acids on the end product. Of course, this is a function of the type of cheese product desired.

The lipase treatment can be effected over various periods of time depending upon the activity of the lipase used, its concentration, temperature, pH and various factors well known in the art. After the completion of the lipase treatment, the fats are broken down to provide free fatty acids at the levels before indicated.

The highly digested proteolytic fermentate and cream, or lipolytic fermentate, are then combined to prepare a mixed fermentate. A further portion of undigested or unfermented protein is added. The unfermented protein is added to the mixed fermentate at a level sufficient to provide for low digestion of the milk proteins in the cultured component. The above-mentioned proteases and lipases, if necessary, are added to provide the mixed fermentate.

The mixed fermentate is preferably fermented for a period of time of from 3 to about 8 hours at a temperature of from about 95° F. to about 105° F. to effect further hydrolysis. This is accomplished at a pH of from 6.6 to 5.9. A cheese-making culture, such as *Streptococcus lactis,* is then preferably added to the mixed fermentate and further fermentation is effected to develop acid and flavor components in the mixed fermentate. Lactose in the mixed fermentate is normally present at a level of from about 1 percent to about 5 percent. This fermentation is normally effected in a period of from about 1 to about 3 hours at a temperature of from about 95° F. to about 105° F. During the fermentation, the lactic culture propagates to provide a highly active fermentation media in the form of the cultured component for the final step in making the cheese.

The cultured component is then combined with protein concentrate and fat required to produce the cheese. As can be seen from FIG. 1, the fat can be supplied from the high fat cream previously produced and/or by additional cream supplied from an outside source. Fat can also be provided from a non-dairy fat derived from animal or vegetable origin. As shown in the flow chart, the non-dairy fat can be homogenized with water or with a portion of unfermented protein concentrate to provide a fat emulsion suitable for addition. The unfermented protein concentrate is preferably in dry form when added to the mixed fermentate to provide the required level of protein. The fat, protein, salts and moisture are balanced to provide a pre-mix for making into a cheese for use in process cheese-type products.

The pre-mix formed by combining protein concentrate, mixed fermentate, fat and water has a composition within the ranges indicated hereinbefore for the pre-mix for American-type process cheese-type products.

The pre-mix is fermented for a period of at least about 15 hours at a temperature of from about 70° F. to about 80° F. to produce the cheese. Longer hold times result in increased cheese flavor development. When desired cheese flavor has developed in the cheese, temperature control at lower temperatures can be used for extended holding of the cheese. Cheese flavor devleops more fully during fermentation and there is further breakdown to provide a product which has good processing characteristics. As before indicated, the cheese is suitable as the sole cheese component or as a component of a blend of cheeses for preparation of process cheese-type products. The cheese may be introduced immediately into a cheese cooker in combination with emulsifying salts and other additives conventionally used in the manufacture of process cheese-type products, including such emulsifiers as disodium phosphate and other phosphate salts.

As shown in FIG. 1, the protein concentrate may be dried after a protein concentration step. The dried protein concentrate may then be stored or shipped in the dry form and reconstituted for use when required. The highly digested proteolytic fermentate and mixed fermentate can also be dried and stored for extended periods. This method of operation of the present invention permits separation of the various steps to permit maximum utilization of existing of existing plant facilities. Also, the use of dried materials more readily permits the establishment of cheese plants in locations remote from the milk producing regions.

The following examples further illustrate various features of the present invention but are intended to in no way limit the scope of the invention which is defined in the appended claims.

EXAMPLE 1

In accordance with one example of the practice of the invention, reference should be made to FIG. 1 wherein the steps of the present example are set forth in the flow chart. Whole raw cow's milk was provided which has a total bacterial count of fifty thousand (50,000) per milliliter, a solids content of 12.5 percent, and a milk fat content of 3.5 percent. One thousands pounds of milk was separated in a DeLaval separator into 930 pounds of skim milk and 70 pounds of cream having a milkfat content of 50 percent. The skim milk was pumped to storage. The skim milk has the following analysis:

| Component | Weight Percent |
|---|---|
| Total Solids | 8.80 |
| Lactose | 4.60 |
| Protein | 3.30 |
| Milkfat | 0.08 |
| Unbound Salts | 0.70 |
| Bound Salts | 0.57 |

Removal of water, unbound salts and lactose was effected by feeding the skim milk into an ultrafiltration unit which comprised one module and which was a 10 POR System maufactured by Dorr-Oliver, Inc. The ultrafiltration unit included a membrane cartridge Model MPX-24. The ultrafiltration membrane had a pore size which was capable of retaining materials having a molecular weight greater than 24,000. The ultrafiltration unit provided about 697 pounds of permeate comprising water, unbound salts, and lactose which comprised 94.5 percent water, 0.5 percent unbound salt, and 4.6 percent lactose. The permeate contained a minor amount of milkfat, i.e., 0.02 percent, and a minor amount of protein, i.e., 0.30 percent. Thus, there is low yield loss of protein and fat.

The ultrafiltration unit also provided about 233 pounds of a protein concentrate which comprised about 77.0 percent water, 15.0 percent protein, 0.7 percent bound and unbound salts, of which about 80 percent was bound and about 20 percent was unbound, 4.7 percent lactose, and 0.2 percent milkfat. The skim milk was concentrated by ultrafiltration in a 5:1 ratio, permeate:-filtrate. The protein filtrate or retentate was diluted with about 266 pounds of water and diafiltered to give 200 pounds of a filtrate having 17.0 percent protein. The amount of the protein, including micellar casein protein and soluble serum protein, recovered in the protein filtrate, gives the process of the invention high yield and avoids the protein losses heretofore incurred with cheese making.

The protein filtrate from the ultrafiltration unit was then subjected to high-temperature, short-time (HTST) treatment to pasteurize the protein filtrate. The HTST treatment consisted of subjecting the protein filtrate to a temperature of 161° F. for 20 seconds after which the protein filtrate was cooled to a temperature of 40° F.

The pasteurized protein filtrate was then dried in a Bowen drier to give about 43 pounds of powder having a total solids of 96 percent, protein at 80 percent and lactose at 4 percent. In this connection, the protein filtrate is further concentrated to 20% total solids for drying. The drying is accomplished with the further concentrated protein filtrate entering the drier at 40° F., through a Spraying Systems nozzle Model 74-20 with high pressure atomization at 2,500 psig. The drier utilizes an inlet air temperature of 350° F. and an outlet air temperature of 175° F., and discharges the protein concentrate at 120° F. as a powder with a moisture of 4.5%. There is no significant heat denaturation of the protein during the drying step.

About 39.1 pounds of powder was set aside for use in the pre-mix and about 3.9 pounds was reconstituted with 8.8 pounds of water for high digest proteolysis. For this treatment, the reconstituted portion was heat treated at 160° F. for 30 minutes to pasteurize the media and it was thereafter cooled to 98° F. NBC protease was added to the protein concentrate at a level of 0.0013 pounds. The fermentation proceeded for a period of 5 hours at a temperature of 98° F. The proteases were deactivated by heating to 165° F. for 15 minutes. The extent of proteolysis during the fermentation of the protein concentrate was characterized as follows: hydrolysis products equal to about 1250 micrograms of TCA soluble tyrosine per milliliter of fermentate. 20 percent of the digestible protein was hydrolyzed to products having a molecular weight of less than 5000. The highly digested fermentate is ready for mixing to provide the mixed fermentate.

The cream from the separator was pasteurized in an HTST pasteurizer at 165° F. for 20 seconds. A portion (16.9 pounds) of the pasteurized cream (50 percent milkfat) was sterilized at a temperature of 180° F. for 15 minutes after which the temperature was adjusted to 98° F. and fermented with 0.18 pounds each of the lipases Italase C and Capalase KL (Dairyland Food Laboratory, Inc., Waukesha, Wis.) to provide a lipolytic fermentate. The fermentation proceeded for 24 hours at a temperature of 98° F. The lipases used are well known in cheese manufacture. The lipase fermentation resulted in the production of fatty acids having the below indicated carbon chain lengths in the indicated percentages as a percentage of the lipolytic fermentate:

| $C_4$ | $C_6$ | $C_8$ | $C_{10}$ |
|---|---|---|---|
| .34% | .11% | .030% | .065% |

The proteolytic fermentate and the lipolytic fermentate were then combined to prepare a mixed fermentate.

Protein concentrate powder was reconstituted to a 20 percent protein level and added. The mixture contained 12.7 pounds of the high digest protein fermentate, 16.9 pounds of the lipolytic fermentate, and 4.2 pounds of the reconstituted protein concentrate (containing 20 percent protein). 0.005 pounds of Rhozyme P-11 protease, 0.005 pounds of Prolase RH protease, and 0.62 pounds of proteolytic micrococcus (*Micrococcus sp* ATCC No. 21829) were then added to the mixture. Fermentation of the mixture proceeded for a period of three hours at a temperature of 98° F. to provide a mixed fermentate.

A conventional cheese-making culture was then added to the mixed fermentate. The culture contained the following at the indicated levels: a commercial cheese starter culture, Hansen H 188 (comprising *Streptococcus lactis* and/or *Streptotoccus cremoris*) in a 10 percent NFDM aqueous media. The culture was added at a level of 13 pounds to the 34 pounds of mixed fermentate. The fermentation of the mixed fermentate and culture proceeded for a period of two hours at 98° F. to provide the culture component.

The protein of cream not used in the lipolytic fermentation was passed through a separator to provide cream having 75% milkfat. The 75% milkfat cream was then added to the cultured component in an amount of 49.9 pounds along with 39.1 pounds of the spray dried protein concentrate, and 3.2 pounds of water was added to adjust the moisture. The pre-mix containing the cultured component, cream, protein concentrate as a powder, and water, when blended together, comprised the following at the indicated levels:

| Component | Percent by Weight |
|---|---|
| Total Solids | 66 percent |
| Protein | 25 percent |
| Lactose | 2.5 percent |
| Ash | 2.7 percent |
| Fat | 33 percent |

The pre-mix was fermented for a period of 17 hours at a temperature of 72° F. to provide 139 pounds of a cheese having an American-type cheese flavor. The cheese was then introduced into a conventional cheese cooker along with 1.47 pounds disodium phosphate, 2.34 pounds trisodium phosphate and 2.5 pounds salt (NaCl) and was cooked in a conventional lay down cooker to a temperature of 160°–165° F. in accordance with the usual practice to provide a process cheese-type product. The process cheese-type product was a process American cheese variety comparable in flavor to a process cheese prepared from a mixture of American-type cheeses.

EXAMPLE 2

Dried protein concentrate is prepared in accordance with Example 1. Dried cream was prepared. The dried protein concentrate is introduced into the process in the manner set forth in Example 1 and the protein concentrate is fermented as described. The dried cream is reconstituted with water to provide a reconstituted cream having 50% fat. The reconstituted cream is fermented with lipases as in Example 1 and is thereafter combined into the mixture for the mixed fermentate. Thereafter, the procedure of Example 1 is used to provide a process cheese-type product which is similar to the product produced in accordance with Example 1.

EXAMPLE 3

In accordance with this Example, the procedures of Example 1 were followed except that the high digest fermentate was introduced into the Bowen spray drier of Example 1 at a concentration of 22%. The high digest fermentate was dried as set forth in Example 1. The dried high digest fermentate was reconstituted and used in the preparation of the mixed fermentate and then the procedure of Example 1 was followed to provide a process cheese-type product.

The resulting process cheese-type product had the texture and flavor of the product of Example 1 and this example illustrates that the process of the invention can be adapted to store or transport the dried protein concentrate and dried high digest fermentate in a highly stable condition.

EXAMPLE 4

In accordance with this example, the mixed fermentate of Example 1 was spray dried in accordance with the conditions in Example 1. The product readily dried and was stored. After storage, the product was reconstituted and was then processed in accordance with Example 1.

The resulting process cheese-type product had the texture and flavor of the process cheese-type product produced by Example 1 and this Example illustrates that the process of the invention can be adapted to transport and store this intermediate product of the invention, under stable conditions.

EXAMPLE 5

In accordance with this Example, the procedure of Example 1 was followed except a non-creamed, acid precipitated cottage cheese curd (18% total solids) was thoroughly macerated in a Mince Master (Griffith Laboratories, Inc.), and resolubized with sodium hydroxide. The resolubilized curd was then dried in accordance with the procedure of Example 1 and the procedures of Example 1 were followed.

The resulting process cheese-type product had flavor and texture like the product of Example 1 and this Example illustrates how the process of the invention can be adapted to utilize a concentrated protein produced by a conventional procedure.

EXAMPLE 6

In accordance with this Example, a process cheese-type product is prepared by substituting a liquid corn oil (Staley's liquid refined, dewaxed, deordorized corn oil) or coconut oil (Humko's Victory 76, partially hydrogenated refined coconut oil) for a substantial amount of the milkfat. In each case the oil used is heated to 125° F., and combined with the protein concentrate produced in Example 1 to provide a homogenized fat-containing substrate having 75 percent fat. Homogenization proceeds in a single stage homogenizer (Manton-Gaulin Corp. homogenizer) at 500 psig. The emulsified fat product is cooled to 45° F. and stored until used. The emulsified fat is substituted for the 75 percent cream in Example 1. The resulting process cheese-type product has flavor and texture similar to that of the process cheese produced by Example 1 and this Example illustrates that fats from vegetable sources can be substituted for milkfat to provide the process cheese-type product of the invention. The Example also illustrates that either a liquid oil or a hydrogenated high melting oil can be used. As another alternative, the oil is added into the cooker.

EXAMPLE 7

In accordance with this Example, 20% of the milk protein in the protein concentrate was replaced with a soy protein concentrate (Isolate 972, from Kraft, Inc., Coshocton, Ohio). The protein concentrate containing soy protein was thereafter subjected to the process of Example 1 to provide a process cheese-type product. The process cheese-type product resembled the process cheese-type product prepared by the method of Example 1 and illustrates that a non-dairy protein can be used in the method of the present invention.

In the foregoing description, a new process for the manufacture of a process cheese-type product has been described which provides a cheese suitable for the preparation of process cheese-type products by a method which is more rapid than heretofore available for the preparation of such products. The process utilizes the fermentation of minor fractions of protein and fat containing substrates. The fermented fractions contain cheese flavor components and precursors therefor, and provide for development of cheese flavor, body and texture characteristics in short periods of time. Further, the process of the invention provides greater control of the cheese-making process, while at the same time, permitting higher yield than other cheese-making techniques. In addition, the process of the invention makes possible economy in the manufacture of a cheese in respect to storage of raw materials, intermediate materials, processing steps and avoidance of long curing times to develop body, texture and flavor. The intermediate cultured component is provided for use in other food products that this process cheese-type products described herein.

Various features of the invention which are believed to be new are set forth in the following claims.

What is claimed is:

1. A process for the manufacture of cheese including the steps of preparing a protein concentrate comprising less than 50 percent moisture, the protein portion of the concentrate comprising more than 50 percent milk protein and containing lactose at a level which is soluble in the moisture present in the cheese, preparing a fat concentrate comprising at least 20 percent fat, proteolyzing a portion of milk protein in an amount equal to between about 5 percent and about 50 percent of the protein in the cheese with a protease used in cheese manufacture, lipolyzing milkfat in an amount of at least 5 percent of the fat in the cheese with a lipase used in cheese manufacture, forming a mixed fermentate of lipolyzed fat and proteolyzed milk protein, blending a minor amount of said mixed fermentate with said protein concentrate and said fat concentrate to provide a pre-mix, adding a cheese starter culture to the mixed fermentate or to the pre-mix to form a mixture thereof, and fermenting said pre-mix to develop acid and provide a cheese having a pH in the range of 5.3 to 4.9.

2. The process in accordance with claim 1 wherein the protein portion of the protein concentrate comprises more than 80 percent milk protein.

3. The process in accordance with claim 1 wherein the protein in the protein concentrate is exclusively milk protein.

4. The process in accordance with claim 1 wherein the fat in the fat concentrate is exclusively milkfat.

5. The process in accordance with claim 1 wherein the fat concentrate comprises at least 65 percent fat and the protein concentrate is in the form of a dry powder.

6. The process in accordance with claim 1 wherein the proteolysis of milk protein is carried out by highly digesting a portion of the milk protein to provide peptides and amino acids having a molecular weight of less than 5000 in an amount of 5 to 35 percent of the digestible protein, and peptides having a molecular weight of between 5000 and 25000 in an amount of 60 to 70 percent of the digestible protein.

7. The process in accordance with claim 1 wherein the cheese is mixed with cheese emulsifying salts and cooked to provide a process cheese-type product.

8. The process in accordance with claim 1 wherein the protein, fat and moisture are adjusted to provide a process cheese-type product.

9. The process in accordance with claim 1 wherein the mixed fermentate has a TCA value of between 1000 and 3000.

10. The process in accordance with claim 1 wherein the milkfat concentrate comprises non-dairy fat in an amount of less than 95 percent of the fat in the cheese.

11. The process in accordance with claim 1 wherein a tryptic protease is utilized for proteolyzing a portion of the milk protein and the protease is inactivated before being mixed into the mixed fermentate.

12. The process in accordance with claim 1 wherein the milkfat is lipolyzed before forming the mixed fermentate.

13. A process in accordance with claim 1 wherein the cheese starter culture is added to the mixed fermentate and the mixture is fermented to provide a cultured component, and said cultured component is blended in a minor amount with said concentrated protein concentrate and with said cream.

14. A process for the manufacture of American-type cheese including the steps of ultra-filtering milk to provide a protein concentrate having less than 50 percent moisture, diafiltering said protein concentrate, further concentrating the diafiltered concentrate, the lactose being present in the concentrated protein concentrate at a level which is soluble in the moisture present in the cheese; preparing a cream comprising at least 20% fat; proteolyzing milk protein in an amount equal to between about 5 percent and about 50 percent of the protein in the cheese using proteases used in cheese manufacture; lipolyzing milk fat in an amount of at least 5 percent of fat in the cheese using lipases used in cheese manufacture, forming a mixed fermentate of lipolyzed fat and proteolyzed protein; blending a minor amount of said mixed fermentate with said concentrated protein concentrate and with said cream to provide a pre-mix; adding to cheese starter culture to the mixed fermentate or to the pre-mix to form a mixture thereof; and fermenting said pre-mix to provide a cheese having a pH in the range of from about 5.3 to about 4.9.

15. A process in accordance with claim 14 wherein the mixed fermentate comprises between about 5 percent and about 35 percent of the total digestible protein as amino acids and peptides having a molecular weight below about 5,000 and between about 60 percent and about 70 percent of the peptides having a molecular weight between about 5000 and 25,000.

16. A process in accordance with claim 14 wherein the protease is derived from the class consisting of *Bacillus subtilus* and from fungi in the *Aspergillus - oryzae* group, and wherein the mixed fermentate includes a proteolytic micrococcus.

17. A process in accordance with claim 14 wherein the cheese starter culture is added to the mixed fermentate and the mixture is fermented to provide a cultured component, and said cultured component is blended in a minor amount with said concentrated protein concentrate and with said cream.

* * * * *

UNITED STATES PATENT AND TRADEMARK OFFICE
CERTIFICATE OF CORRECTION

PATENT NO. : 4,244,971
DATED : January 13, 1981
INVENTOR(S) : Robert Wargel et al.

It is certified that error appears in the above—identified patent and that said Letters Patent is hereby corrected as shown below:

On cover page of Patent after "Other Publications", second column, line 2, delete "Enzyme-Mole" insert --Enzyme-Mold--.

Column 4, line 48, delete "cheese" insert --cheeses--.

Column 6, line 17, "Further" should not be indented.

Column 6, line 34, delete "wherein" insert --whereas--.

Column 7, line 57, delete "of" insert --and--.

Column 10, line 6, delete "on" insert --in--.

Column 11, line 17, delete second occurrence "of existence".

Column 13, line 23, delete "protein" insert --portion--.

Column 16, line 47, delete first occurrence "to" insert --a--.

Signed and Sealed this

Eighth Day of September 1981

[SEAL]

Attest:

Attesting Officer

GERALD J. MOSSINGHOFF
Commissioner of Patents and Trademarks